United States Patent Office 3,580,830
Patented May 25, 1971

3,580,830
PREPARATION OF XANTHATE TERMINATED POLYMERS
Alan R. Siebert, Maple Heights, Ohio, assignor to The
B. F. Goodrich Company, New York, N.Y.
No Drawing. Filed Sept. 5, 1968, Ser. No. 757,785
Int. Cl. C08d 1/00; C08f 1/16
U.S. Cl. 204—159.24
2 Claims

ABSTRACT OF THE DISCLOSURE

Xanthate terminated polyesters are known intermediates in the preparation of mercaptan terminated olefin polymers and copolymers. An improved process for the preparation of these intermediates involves the reaction of olefin monomer(s) with a xanthogen disulfide in the presence of a particular range of high energy radiation. The disulfide acts both as a source of free radicals and also as a polymerization modifier.

BACKGROUND OF THE INVENTION

Liquid elastomers, pourable at room temperature at the point of application and then curable to the solid state in situ at ambient temperatures, are useful as adhesives, and as caulking and potting compounds. Included in this useful class of materials are low molecular weight liquid mercaptan terminated polyolefins including both homopolymers and copolymers. These materials are most efficiently made and used if the polymer chains have a reactive mercaptan (—SH) group at each end, that is, the material has a mercaptan functionality value of 2.0±0.20. Present processes produce liquid polymers with mercaptan termination functionalities caluclated as shown below of about 1.55 to 1.75. The liquid polymers undergo room temperature cure by the reaction of such curing agents as diepoxides, diacrylates, triacrylates, diisocyanates and metal oxides with the terminal mercaptan groups.

Mercaptan terminated polyolefins are readily prepared by hydrolysis and pyrolysis of xanthate terminated polyesters whereby terminal xanthate groups are converted to mercaptan groups. A terminal mercaptan group is formed only at places where the polyester chain ends in a xanthate group. The limiting factor in obtaining polymers with mercaptan functionality of 2.0 is the ability to obtain intermediate xanthate terminated polyester with xanthate termination at each end of the polyester chain.

This invention deals with the preparation of the xanthate terminated polyester intermediate compounds and is concerned with preparation of such intermediates with essentially complete xanthate termination, that is, the presence of a xanthate group at each end of the polymer chain so that the ultimate mercaptan terminated polymer which is prepared will have a mercaptan group in place of said xanthate group at each end of every polymer chain. These xanthate terminated polyesters are generated by the reaction of an olefinic monomer or monomers with a xanthogen disulfide material exemplified by the formula:

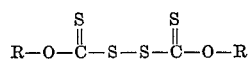

wherein R may be an aliphatic radical such as methyl, ethyl, propyl, isopropyl, butyl, amyl or lauryl; an aryl radical such as phenyl or beta naphthyl; an aralkyl radical such as benzyl; and an alicyclic radical such as cyclohexyl. Typical xanthogen disulfides used for this purpose are diisopropyl xanthogen disulfide, dibutyl xanthogen disulfide, di(beta-naphthyl) xanthogen disulfide and dicyclohexyl xanthogen disulfide. These xanthogen disulfides are known in the polymerization art as chain transfer agents or modifiers. In that capacity they are generally used in ratios of 0.2 to 2.0 parts by weight per 100 parts of monomer. Much greater amounts than this are employed in the practice of the invention.

From 2 to 45 parts by weight of xanthogen disulfide per 100 parts by weight of olefinic monomer may be employed in the process of this invention. Preferred amounts of xanthogen disulfide employed range from 5 to 25 parts per 100 parts by weight of monomer.

The polymerization reaction of olefinic monomer and the xanthogen disulfide proceeds through a free radical mechanism. The xanthogen disulfide does not undergo thermal dissociation to form free radicals below 90° C. or higher and it is also customary to use a material which does dissociate into free radicals at lower temperatures and in turn reacts with the xanthogen disulfide to convert it to free radicals. Diazo compounds, inorganic persulfates, peroxides and hydroperoxides have been used for this purpose in the art. Representative initiators include bisazoisobutyronitrile, potassium and ammonium persulfates, hydrogen peroxide, dicumyl peroxide, benzoyl peroxide and tertiary butyl hydroperoxide.

Particularly when alkyl acrylate monomers are employed in the preparation of xanthate terminated liquid polymers for conversion to mercaptan terminated polymers it has been difficult to achieve terminal mercaptan functionality of about 2.0 which indicates that there is not mercaptan termination at each end of all of the short polymer chains. When a chemical free radical catalyst such as those cited above, or similar thereto, a peroxide, for instance, a bisxanthogen disulfide, such as those cited above, and an olefinic monomer such as a lower alkyl acrylate in which the alkyl group contains 1–8 carbon atoms, are exposed to polymerization conditions, the peroxide catalyst generates free radicals.

The peroxide free radicals can initiate the xanthogen disulfide to convert it to free radicals and/or they can initiate molecules of the acrylate monomer. The latter reaction is undesirable for the purposes of this invention for it creates a polymer chain on which at least one end terminates in an unreactive peroxide group and that chain cannot, therefore, be difunctional in mercaptan. Olefin polymers are also known to terminate by disproportionation into nonreactive end groups, thereby further lowering the chance of achieving 100% reactive terminated liquid polymer with a functionality of 2.0. A xanthogen disulfide free radical can also initiate molecules of butyl acrylate monomer. This reaction is desirable for the purposes of this invention for it creates a polymer chain that has a reactive xanthate group termination. The xanthate group is convertible by heat or pyrolysis to the more favored mercaptan group. If all of the olefin polymer chains terminate at both ends in xanthate groups and all xanthate groups are then converted to mercaptan, then the polymer will have a functionality of 2.0. Values of functionality as low as 1.80 are explained by any failure to achieve full xanthate termination (as by some disproportionation) or any failure to convert every available terminal xanthate to mercaptan. Values of functionality up to 2.20 are explained by possible branching from the olefin chain double bonds whereby chains with three or more terminal groups may be formed on a given polymer chain.

The olefinic monomer, herein defined as a monomer containing at least one $H_2C{=}C{<}$ group, is polymerized to a number average degree of polymerization of at least 10 in the presence of the above-described xanthogen disulfide. The term "number average degree of polymerization" as used herein is defined as the number of monomer units in one polymeric molecular chain. In homopolymerization "one monomer unit" is equal to the molecular weight of the monomer employed. In copolymerizing mixtures of monomer "one monomer unit" represents the quantity of polymer molecule that contain mol fractions of each combining monomer such that the sum of all the mol fractions is equal to one. The mol fraction of each of the monomers in a structural unit is determined by the combining ratio of each of the monomers in the make up of the whole polymer molecule.

Representative monomers containing $H_2C=C<$ groups include: styrene, acrylonitrile, acrylic acid, conjugated diene hydrocarbons such as butadiene-1,3 and isoprene; ring halogenated styrenes such as 2,3-chlorostyrene, ring alkylated styrene such as α-methyl styrene, vinyl pyridine, and alkyl acrylic esters such as methyl acrylate, ethyl acrylate and butyl acrylate. The monomers may be employed singly to form homopolymeric bisxanthate esters or two or more monomers which are mutually polymerizable may be used to form copolymeric bisxanthate polyesters. A typical single monomer to employ is butyl acrylate; a typical mixture to employ is one of butadiene and styrene or butadiene and acrylonitrile. Mixtures of similar monomers such as ethyl acrylate/butyl acrylate are also useful.

The monomer or monomers containing at least one $H_2C=C<$ group are polymerized in the presence of the xanthogen disulfide to form a polymeric bisxanthate ester which has the formula

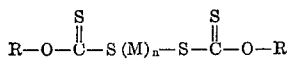

where R is selected from the group consisting of aliphatic, aryl, aralkyl and alicyclic radicals, M is a monomer unit and $n$, the number average degree of polymerization, is at least 10. In the art any conventional free radical polymerization catalyst may be employed. Emulsion polymerization employing a surface active agent such as soap in an aqueous medium to form an emulsion of the monomer, solvent polymerization, and bulk polymerization are possible in the practice of this invention.

SUMMARY OF THE INVENTION

This invention provides an improved initiator for free radicals for the reaction of olefinic monomer and xanthogen disulfide to produce xanthate terminated polyester comprising a particular band of high energy radiation. This band of radiation spans the wavelength range of 3000 A. to 3800 A. and is most readily generated in the form of ultraviolet (UV) light. The reaction of olefin and xanthogen disulfide in the presence of a free radical initiator yields liquid polymer which is mainly xanthate terminated polymer, but it is found that not all of the olefin polymer chains ends are converted to reactive mercaptan when the xanthate terminated polymer is subjected to hydrolysis or pyrolysis to accomplish this conversion because some of these chain ends are terminated in unreactive peroxide groups or other unreactive groups depending upon the particular chemical free radical catalyst which was used or the amount of disproportionation termination which has occurred. The mercaptan functionalities of the products thus tend to range from about 1.55 to 1.75. Lower functionalities are obtained in the case of polyalkyl acrylates, for instance, than in that of polybutadiene. More efficient, effective and economic end materials will be realized if the mercaptan functionality, particularly of alkyl polyacrylates and copolymers thereof, can be raised to 2.0±0.20, that is, if all or virtually all of the liquid polymer chains can be terminated at both ends with a xanthate group which can be converted to a mercaptan group. This result has been accomplished in the invention by eliminating the chemical free radical catalyst and providing a superior free radical initiator, a particular range of radiation, namely 3000 A. to 3800 A. which creates free radicals in the system solely from the xanthogen disulfide. Various forms of UV light have been found useful as the desired range of radiation. Blacklight fluorescent lamps are very effective.

Monomers and the xanthogen disulfide are charged to the reaction vessel. Glass or stainless steel vessels are preferred. Cooling is provided if the reactor contents temperature rises above 50° C. and the reactor contents are agitated throughout the reaction. A nitrogen flush or purge is provided as the reactor is charged. Air or oxygen has an inhibiting effect on the reaction. The polymerization rate of olefin(s) to form xanthate terminated polyolefin chains is followed by performing a total solids analysis on samples withdrawn at intervals. The reaction can be run to 100% conversion but it is generally more economical to run to about 70–80% conversion and recover unreacted monomer for reuse. When the lower conversion level is used, a vacuum is applied to the reactor to remove unreacted monomer(s). If a pyrolysis reaction is to be employed to convert xanthate end groups to mercaptan end groups, it may then be accomplished by heating the polymerization vessel to 150°–250° C. after the removal of excess monomer. The pyrolysis time required ranges from 2 to 30 minutes. If a hydrolysis conversion process is employed, the xanthate terminated polymer is preferably removed to a second reactor and treated with a hydrolysis reagent, preferably an alkaline alcoholate such as KOH. The effectiveness of the process for producing the desired liquid polymers with xanthate termination at each end of the polymer chain is evaluated by converting the intermediate into a liquid polymer having mercaptan termination at each point where the intermediate had xanthate termination and analyzing for the mercaptan termination. Toluene is the solvent used and a 65° C. probe is employed. Functionality is calculated as follows:

$$\frac{\text{Percent SH} \times \text{Mn}}{33 \text{ (equivalent weight of SH)}} = \text{Functionality}$$

From this formula it can be seen that the desired functionality of 2.0±0.20 can be obtained by a range of mercaptan percents and molecular weights. A mercaptan range of 2.40 to 3.00 percent combined with a molecular weight range of about 2200 to 3200 has been found to result in the best products from the standpoints of rapidity of cure, freedom from residual stickiness to the touch and general levels of tensile strength and percent elongation at break, although still valuable products are obtained with percent mercaptan as high as 4.5% and molecular weight as low as 1600. The xanthate terminated liquid polymers obtained using the radiation initiator of this invention are free of catalyst residue impurities and other reaction by products such as peroxide terminated polyolefin and convert by hydrolysis or pyrolysis to water white mercaptan terminated liquid rubbers.

The most effective wavelength of the radiation used to catalyze the olefin-xanthate reaction to form xanthate terminated polyolefin is fairly narrow and critical. It spans about 3000 A. to 3800 A. in the radiation spectrum. When a germicidal lamp, which generates radiation primarily at about 2550 A., is compared with a black light which generates radiation primarily at about 3660 A., as the radiation initiator source for this reaction and the conversion is followed by analysis for percent total solids (TS), the following results are found:

| Radiation Wavelength, A.: | Percent TS a 30 min. |
| --- | --- |
| 3660 | 33.2 |
| 2500 | 13.2 |

The lower wavelength leads to slower reactions and increases the likelihood of UV initiation of the monomer itself, which leads to unreactive end groups.

Different methods of obtaining useful radiation of desired wavelength are available. The lamp or other source can be selected for its ability to generate radiation primarily in the desired band, or it is possible to use lamps that generate a wider band of radiation, but have a screen to stop lower and/or higher wavelengths than are desired. Pyrex glass will filter out most light radiation below 3000 A. Radiation with wavelength greater than 3800 A. is mainly in the form of heat and does not accomplish the desired results of this invention.

DETAILED DESCRIPTION OF THE INVENTION

In the following examples parts are given as parts by weight, unless otherwise stated.

Example 1

Alkyl acrylate monomers and diisopropyl xanthogen disulfide are charged to a glass reactor equipped for agitation, pressure and temperature contol and reflux of contents. The entire assembly is shielded from impingement of natural or artificial light and other radiation except as desired by the operator. The reactor is purged with nitrogen after the ingredients are charged, sealed, and brought to the desired reaction temperature by heat from an electric mantle. When the operating temperature is reached, the initiator radiation source is switched on. The reaction of monomers and xanthogen disulfide is followed by the total solids evaluation of samples, withdrawn periodically, to about 80% conversion. At this point the radiation source is switched off. Vacuum of 0.2 mm. Hg or less is applied to remove excess monomer and temperature is raised to 200° C. by the electric mantle for one hour to induce conversion of xanthate terminal groups to mercaptan groups by pyrolysis. Carbon oxysulfide gas and a gaseous olefin corresponding to the R group of the xanthogen disulfide are byproducts.

The mercaptan terminated product is a water white liquid and is evaluated as a caulking compound by curing with an epoxide resin employing amine catalysis in the ratio of 1.25 equivalents epoxy resin per equivalent weight of mercaptan and 6% by weight of epoxy resin of amine.

Preparation of xanthate terminated liquid polymer.

| Material | A | B |
|---|---|---|
| n-Butylacrylate | 70 | 70 |
| Ethyl acrylate | 30 | 30 |
| Diisopropyl xanthogen disulfide | 8 | 8 |
| Reaction temp., ° C. | 10 | 30 |
| Radiation source | (1) | (2) |

1 15 watt black light flourescent.
2 30 watt black light fluorescent.

Properties of uncured mercaptan terminated liquid polymer.

| | A | B |
|---|---|---|
| Percent SH | 2.43 | 2.43 |
| Mn | 2,460 | 2,550 |
| Functionality | 1.81 | 1.88 |
| Brookfield viscosity at 27° C., cps | 8,000 | 9,000 |

Cure recipe for liquid mercaptan terminated polymer:

| | Parts | |
|---|---|---|
| Material | A | B |
| Polymer | 100 | 100 |
| Diglycidol ether of bisphenol A (1.25 eq. epoxy/SH) | 16.5 | 16.5 |
| 2,4,6-tri(dimethylaminomethyl) phenol | 1.0 | 1.0 |

Cured properties of mercaptan terminated polymer:

| | A | B |
|---|---|---|
| Tensile, p.s.i. | 330 | 390 |
| Elongation, percent, break | 860 | 640 |

The products are water white liquids and flow readily, but are not runny or water thin. For caulking compounds use, viscosities up to 50,000 cps. are preferred, though materials with viscosities up to about 1,000,000 cps. will flow and would be favored by some users. Caulking compounds are designed to fill gaps and crevices, to expand and contract and to support little more than their own weight. It is desired that they have a percent elongation at break that is numerically greater than their tensile strength. An elongation at break of at least 600-800% is desired in the cured materials to allow for addition of fillers and other compounding materials. Materials made from the intermediate products produced by the method of the invention meet these requirements.

The example is repeated employing a 3 tier circular black light fluorescent lamp totalling 90 watts instead of the single tube lamps of 15 watts and 30 watts. The reaction temperature is 50° C., which is higher than the other runs, and is expected. The product has similar functionality, viscosity and tensile properties to the products of runs A and B.

Example 2

The procedure of Example 1 is followed using a variety of monomers in the original polymerization to form xanthate terminated polymer. Again the xanthate terminated polymer is converted to mercaptan terminated polymer after unreacted monomer is stripped under vacuum. Again the mercaptan terminate polymer is cured with epoxide in an amine catalyzed system.

Preparation of xanthate terminated liquid polymer:

| Material | C | D | E | F |
|---|---|---|---|---|
| n-Butyl acrylate | | 100 | 60 | 95 |
| Ethyl acrylate | 100 | | 40 | |
| Acrylonitrile | | | | 5 |
| Diisopropyl xanthogen disulfide | 8 | 8 | 10 | 8 |

Properties of uncured mercaptan terminated liquid polymer:

| | C | D | E | F |
|---|---|---|---|---|
| Percent SH | 2.22 | 2.40 | 3.00 | 2.74 |
| Mn | 3,040 | 2,460 | 1,940 | 2,610 |
| Functionality | 2.04 | 1.79 | 1.77 | 2.16 |
| Brookfield vsicosity at 27°, cps | 160,000 | 6,000 | 7,500 | 15,000 |

The higher viscosity noted in Run C is due to the higher second order transition temperature of ethyl acrylate compared to butyl acrylate. Functionality values of Runs D and E are within the range of experimental error to 1.80.

Properties of cure of mercaptan terminated liquid polymers:

| | C | D | E | F |
|---|---|---|---|---|
| Tensile, p.s.i. | 370 | 210 | 340 | 370 |
| Elongation, percent, break | 610 | 850 | 900 | 400 |
| Gehman freeze, ° C. | −11 | 1 −45 | −22 | −20 |

1 Estimated.

The products have excellent low temperature properties.

Example 3

The procedure of Example 1 is followed to prepare a 70/30 mercaptan terminated copolybutyl acrylate/ethyl acrylate (G).

A second mercaptan terminated copolymer of butyl acrylate/ethyl acrylate (H) is prepared in a bulk polymerization system using benzoyl peroxide catalysis by polymerizing at 90° C. for one hour in a laboratory polymerization bottle.

A third mercaptan terminated copolymer of butyl acrylate/ethyl acrylate is prepared in an emulsion polymerization using ammonium persulfate catalysis and polymerizing 3 hours at 90° C. The polymer is coagulated with a 2% solution by weight of sodium chloride in methanol used at a ratio of 50 parts solution to 50 parts latex. The product is given a water wash and two alcohol washes.

In all three cases the xanthate terminated polymer is converted to mercaptan terminated polymer by pyrolysis at 200° C. for one hour. In addition to tensile strength and percent elongation compounds, the polymers are compared by calculating the tensile product which equals tensile strength times elongation and is roughly equal to the work required to break the sample in p.s.i.

Preparation of liquid xanthate terminated polymer:

| Material | G | H | I |
|---|---|---|---|
| n-Butyl acrylate | 70 | 70 | 70 |
| Ethyl acrylate | 30 | 30 | 30 |
| Diisopropyl xanthogen disulfide | 8 | 8 | 8 |
| Benzoyl peroxide | | 0.5 | |
| Water | | | 100 |
| Sodium lauryl sulfate | | | 1.0 |
| Ammonium persulfate | | | 0.2 |

Properties of uncured mercaptan terminated liquid polymer:

| | G | H | I |
|---|---|---|---|
| Percent SH | 2.60 | 1.86 | 1.75 |
| Brookfield viscosity at 27° C., cps | 13,000 | 21,000 | 31,000 |
| Functionality | 1.87 | 1.51 | 1.56 |

Properties of cured mercaptan terminated polymers:

| | G | H | I |
|---|---|---|---|
| Tensile, p.s.i. | 450 | 150 | 370 |
| Elongation, percent, break | 550 | 600 | 470 |
| Tensile product p.s.i. ×$10^4$ | 24.8 | 9.0 | 14.1 |

The material of the invention (G) has lower viscosity, hence is easier to pour and use, but is not so fluid as to be runny. It has a mercaptan functionality much closer to 2.0 than either of the other products and the tensile product rating signifies a much higher working strength than the comparable materials have.

Example 4

Xanthate terminated copolymer of butadiene/acrylonitrile is prepared and converted to mercaptan terminated copolymer by charging monomers, xanthogen disulfide, and, in one case, t-butanol to a glass reactor bottle equipped for agitation by magnetic stirrers.

Radiation sources are a General Electric GE H-100A-4 bulb (J) and circular black light fluorescent lamp with three 12" bulbs mounted tier (K). The main radiation output of these lights is in the 3400 A.–3600 A. range. In front of the lights alone, bottle contents reach 40°–45° C. A Pyrex glass constant temperature bath can be placed inside the fields of the lights so that polymerization can be run at 50°, 60°, or even 90° C.

At the conclusion of a polymerization the reaction bottle is vented of unreacted butadiene and the contents are dried on a Rinco evaporator. An antioxidant, 0.2 phr. of 2,5-di-t-pentyl hydroquinone is added before drying. The liquid xanthate terminated polymers are placed in a flask in a 180° C. oil bath for 60 minutes to convert them to mercaptan terminated polymer by pyrolysis.

Preparation of liquid xanthate terminated polymer:

| Material | J | K |
|---|---|---|
| Acrylonitrile | 25 | 25 |
| Butadiene | 75 | 75 |
| Diisopropyl xanthogen disulfide | 12 | 12 |
| t-Butanol | | 50 |
| Time/temp | (¹) | (¹) |
| Percent conversion | 55 | 55 |

¹ 64 hrs. at 45° C.

The mercaptan terminated products are water white liquids and are evaluated as caulking compounds after the pyrolysis by curing with an epoxide resin employing amine catalysis in the ratio of 1.25 (J) and 1.1 (K) equivalents epoxy resin per equivalent weight of mercaptan and 6% by weight of the epoxy resin of an amine. Increasing the epoxy ratio raises the tensile strength.

Properties of liquid mercaptan terminated polymers:

| | J | K |
|---|---|---|
| Percent SH | 4.44 | 4.20 |
| Mn | 1,570 | 1,530 |
| Functionality | 2.12 | 1.95 |
| Viscosity at 27° C., cps | 41,000 | 36,000 |

Cure recipe for liquid mercaptan terminated polymers:

| | J | K |
|---|---|---|
| Prepared polymer | 100 | 100 |
| Diglycidol ether of bisphenol A | 30 | 25 |
| 2,4,6-tri(dimethylaminomethyl) phenol | 1.8 | 1.5 |

Cured properties of mercaptan terminated polymers:

| | J | K |
|---|---|---|
| Tensile, p.s.i. | 900 | 270 |
| Percent elongation | 530 | 810 |

When liquid xanthate terminated copolymers of acrylonitrile/butadiene are prepared in an emulsion system with peroxide catalysis and then converted by pyrolysis to mercaptan terminated copolymers, there is a tendency for the polymer to increase in viscosity as pyrolysis continues. If the xanthate terminated copolymer is prepared by the radiation initiation procedure of the invention there is only a moderate increase in viscosity observed. The process of the invention can also be applied to bulk or solution polymerized systems.

Polymer L is prepared by the procedure set forth in Example 1. A control polymer is prepared using diisopropyl benzene hydroperoxide catalysis and an emulsification system. Polymerization is run at 25° C. and is short-stopped at 53% conversion.

Preparation of liquid xanthate terminated polymer:

| Material | Control | L |
|---|---|---|
| Acrylonitrile | 20 | 20 |
| Butadiene | 80 | 80 |
| Diisopropyl dixanthogen disulfide | 12 | 12 |
| t-Butanol | | 50 |
| Peroxide | 3.6 | |
| Sodium dodecyl benzene sulfonate | 4.5 | |
| Water | 180 | |
| Sodium bisulfite | 0.2 | |
| 2,5-ditertiary-pentyl hydroquinone | 2.5 | |
| Percent conversion | 53 | 60 |
| Brookfield viscosity at 27° C. cps., xanthate terminated polymer | 20,000 | 19,200 |
| Brookfield viscosity at 27° C., cps., mercaptan terminated polymer, 1 hour pyrolysis at 180° C | 28,000 | 20,200 |
| Brookfield viscosity at 27° C., cps., mercaptan terminated polymer, 2 hour pyrolysis at 180° C | | 21,000 |
| Functionality (SH) | 1.73 | 1.94 |

Example 5

When the procedure of Example 4 is followed except that the xanthate terminated copolymer is not vented of butadiene and dried in the Rinco evaporator before the conversion to mercaptan terminated polymer, but after the butadiene is vented, the reactor contents are reduced directly to the mercaptan terminated state, the final polymer is comparable to that of Example 4 in every way.

Preparation of liquid xanthate terminated polymer:

| Material: | M |
|---|---|
| Acrylonitrile | 25 |
| Butadiene | 75 |
| Diisopropyl xanthogen disulfide | 12 |
| t-Butanol | 50 |
| Percent conversion | 65 |

Properties of mercaptan terminated liquid polymers:

| | M |
|---|---|
| Percent mercaptan | 4.34 |
| $\overline{Mn}$ | 1570 |
| Functionality (SH) | 2.07 |
| Brookfield viscosity at 27° C., cps. | 38,000 |

Cure recipe for the mercaptan terminated polymer:

| Material: | M |
|---|---|
| Prepared polymer | 100 |
| Diglycidol ether of bisphenol A | 30 |
| 2,4,6 - tri(dimethylaminomethyl)phenol | 1.8 |

Cured properties of mercaptan terminated polymer:

| | M |
|---|---|
| Tensile, p.s.i. | 510 |
| Percent elongation | 810 |

I claim:

1. The method of making liquid compositions comprising xanthate terminated polymers of olefinic monomers containing at least one $H_2C=C<$ group and selected from the group consisting of styrene, butadiene, isoprene, acrylonitrile, acrylic acid, 2,3 - chlorostyrene, alpha-methyl styrene, vinyl pyridine, methyl acrylate, butyl acrylate and ethyl acrylate comprising reacting said monomers at 10°–50° C. in the presence of radiation in the wave-length range of 3000 A.–3800 A. with a xanthogen disulfide material until the monomer conversion, as measured by total solids analysis, reaches a desired level between 70% and 100%.

2. The method of making liquid composition comprising xanthate terminated polymers of olefinic monomers selected from the group consisting of styrene, butadiene, isoprene, acrylonitrile, acrylic acid, 2,3 - chlorostyrene, alpha-methyl styrene, vinyl pyridine, methyl acrylate, butyl acrylate and ethyl acrylate by reaction of a xanthogen disulfide material of the formula:

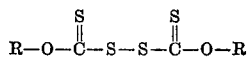

wherein R is selected from the group consisting of aliphatic, aralkyl and alicyclic radicals, said xanthogen disulfide being the only source of free radicals in the polymerization system and said free radicals being generated therefrom by the action of radiation of 3000 A.–3800 A. on said xanthogen disulfide at temperatures of 10°–50° C.

References Cited

UNITED STATES PATENTS 3,409,527  11/1968  Lefevre et al. ____ 204—159.15

OTHER REFERENCES

Polymer Science & Technology, Post. P, volume 2, No. 12, May 6, 1968, p. 58.

MURRAY TILLMAN, Primary Examiner

R. B. TURER, Assistant Examiner

U.S. Cl. X.R.

204—159.15, 159.18; 260—77.5R, 79, 79.7, 836, 837R